UNITED STATES PATENT OFFICE.

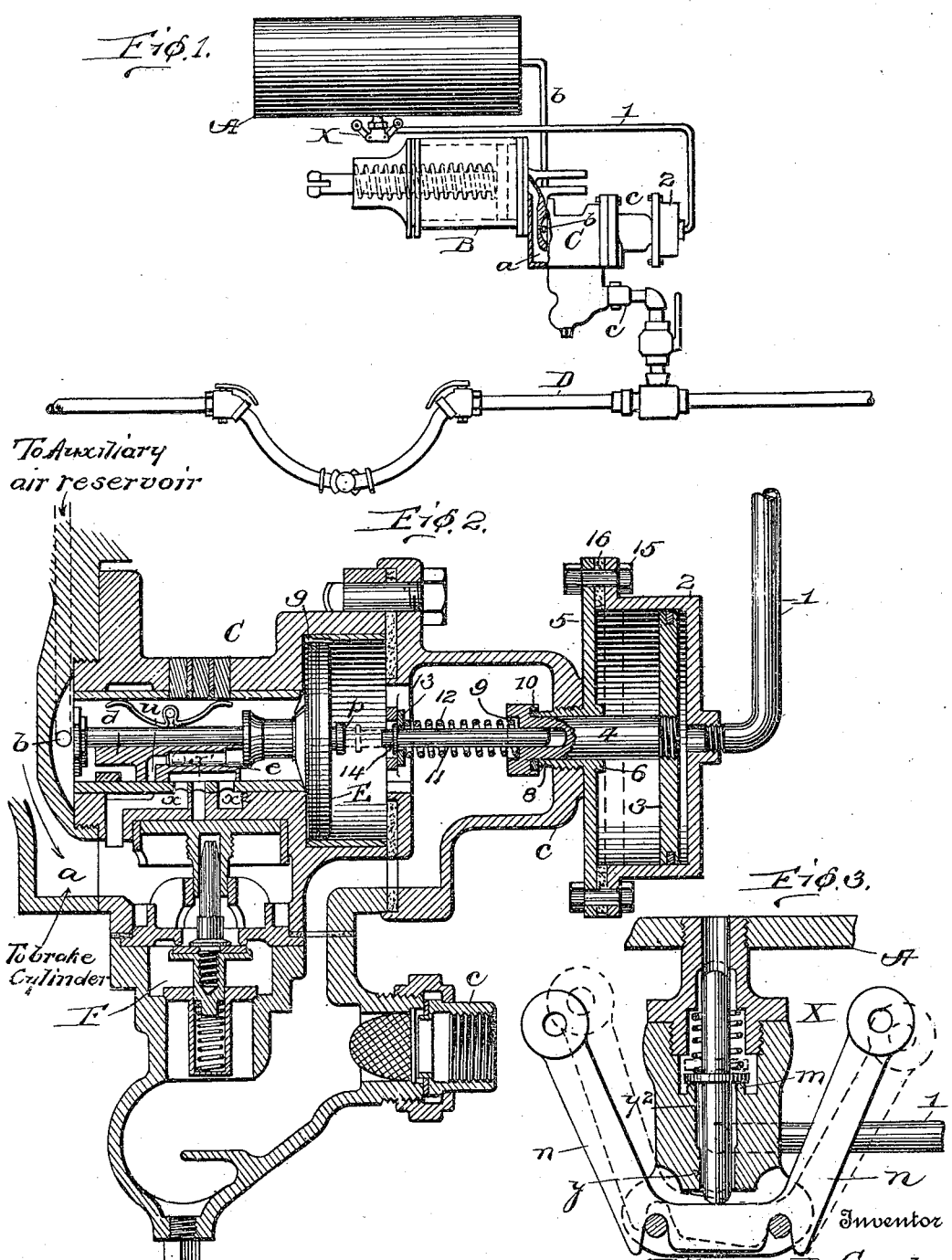

WILLIAM S. DE CAMP, OF CHILLICOTHE, OHIO.

MEANS FOR RELEASING AIR-BRAKES AND ECONOMIZING AIR.

950,165.   Specification of Letters Patent.   Patented Feb. 22, 1910.

Application filed September 16, 1909. Serial No. 518,027.

*To all whom it may concern:*

Be it known that I, WILLIAM S. DE CAMP, a citizen of the United States, residing at Chillicothe, in the county of Ross and State of Ohio, have invented certain new and useful Improvements in Means for Releasing Air-Brakes and Economizing Air, of which the following is a specification.

My invention relates to air brakes for railway cars of that type which employ what is known as the triple valve. This valve coöperates with an auxiliary air reservoir, the brake cylinder, the train pipe and the engineer's brake valve, in such a way that when the engineer opens his brake valve and reduces pressure in the train pipe, the air from the auxiliary reservoir will pass into the brake cylinder and apply the brakes, but when the engineer again raises the air pressure in the train pipe, the brakes will be released. It sometimes happens, however, that the engineer is not able to raise the pressure in the train pipe quickly, especially if there be leaks in the train pipe, or the train be long, and the brakes will not be promptly released. In such case a certain amount of air is let out of the auxiliary air reservoir by the manual operation of a bleeding cock so as to secure quick back movement of the triple valve by reducing the air pressure on the auxiliary reservoir side of the triple valve instead of waiting for the engineer to pump up to the required pressure on the train pipe side. This bleeding of the auxiliary is done by hand, takes some time and wastes a considerable quantity of air. My invention is designed to take air from this auxiliary reservoir without wasting it and to turn it into an extra cylinder and against an extra piston which is of larger size in cross sectional area than the triple valve piston and so by a differential effect cause the same air pressure on this larger piston to dominate and force back the triple valve piston, so as to set it immediately back to the release position, thus instantly removing the brakes and doing so without any loss of air.

Figure 1, is a side view partly in section of the auxiliary air reservoir, brake cylinder, train pipe and triple valve connecting them as equipped with my improved attachments. Fig. 2, is an enlarged longitudinal section of the triple valve with my invention applied thereto, and, Fig. 3, is a sectional detail of the auxiliary air reservoir valve.

In the drawing, Fig. 1, A represents the auxiliary air reservoir, B is the brake cylinder, C the triple valve and D the train pipe of that part of the ordinary air brake system which is located on each car. As is well known, this system operates by the reduction of the air pressure in the train pipe by the engineer opening his brake valve. Thus, the normal air pressure in the train pipe being 70 pounds, when the engineer reduces this pressure to 50 pounds, then the air in the auxiliary air reservoir A is allowed, through the action of the triple valve C, to enter the brake cylinder B, and, forcing back its piston, applies the brakes. The action of the triple valve in accomplishing this result will best be understood from Fig. 2, in which $a$ is the connection with the air brake cylinder, $b$ the pipe leading to the auxiliary air reservoir, $c$ the connection for the train pipe, E the triple valve piston, $d$ the slide valve and $e$ the graduating valve. The parts shown at F relate to the emergency valve and need not be described.

It will be sufficient for the purpose of explaining my invention to state, that when air pressure is reduced in the train pipe, the air pressure from the auxiliary reservoir forces the triple valve piston E to the right, and the latter carries the slide valve $d$ and graduating valve $e$ with it, and when the slide valve moves to a position in which the ports $x$ and $u$ are in communication, the air from the auxiliary reservoir passes from $b$ to $a$ and forcing back the piston of the air brake cylinder applies the brake. To release the brake, the engineer raises the pressure in the train pipe and this acting against piston E sends it back again to the left, as in Fig. 2 in which position ports $x$, $x^1$, and $x^2$, are brought into communication and the air which was in the brake cylinder passes out through the ports to the outside air, the port $x^2$ being a vent port open to the outside air. If, however, from a leaky train pipe, or a very long train, the engineer is unable to promptly raise the air pressure in the train pipe, it has been customary to expedite the moving back of the piston E to the left by reducing the air pressure on the left hand side by a bleeding cock on the auxiliary air reservoir, but this involves a great waste of air, for the engineer must afterward not only pump up the normal pressure in the train pipe, but must also raise the pressure in the auxiliary air reservoir which has been reduced by bleeding. My invention is designed to provide for these difficulties in a simple and economical way and to insure a quick and independent release of brakes. For this purpose, see Fig. 1, I connect the bleeding cock X of the auxiliary air reservoir to a supplementary air cylinder 2 by means of a pipe 1 and, when the brakeman opens this bleeding cock, instead of discharging and wasting this air, it is sent to the cylinder 2 and is there made to instantly release the brakes, as I will now more fully describe with reference to Figs. 2 and 3.

Fig. 3 represents the old form of bleeding cock X. It consists of spring seated valve $m$ which may be lifted off its seat by a double acting lever $n$ $n$. When either end of this lever is pulled, it tilts about the nearest fulcrum, as indicated in dotted lines, and, by pressing inwardly the valve stem, opens the valve, but in my invention instead of opening the valve to the outer air, it opens it into the pipe 1 leading to my supplementary cylinder 2. This cylinder 2 is bolted at 15 with a packed joint 16 to a head 5 which is formed with a plug 6 which latter is screwed to and fixed in the end of the triple valve casing $c$. The supplementary piston 3 is made of a greater diameter than the triple valve piston E so as to operate thereon through its plunger stem 4 with a differential effect, that is to say, the air pressure on the right side of piston 3 will be sufficient by reason of its greater area to force inwardly (to the left) the triple valve piston E against an equal air pressure on the left of piston E. The plunger 4 of the piston 3 slides freely through the plug 6 and the end of said plunger is concentrically bored to receive a stem 11 which has a rigid collar 14 near the inner end. Against this collar 14 there bears a loosely sliding washer 13, and against this washer bears a coil spring 12 whose other end is received into the cavity of the enlarged cup-shaped end 9 of plunger 4. Behind this cup-shaped enlargement 9 is an elastic ring 10 which, when the plunger 4 moves to the right takes up against a projecting cuff 8 on the inner side of the triple valve casing around the plunger to cushion the blow. Now when the air from the auxiliary reservoir passes through pipe 1 to the cylinder, it by the greater area of piston 3 (over piston E), forces the piston and its plunger 4 to the left as in dotted lines and the stem 11 strikes the central button $p$ of the triple valve piston E and pushes the latter with its slide valve back to the release position. The spring 12, which serves the purpose of cushioning the piston E in the usual way, forces the supplementary piston back again to the right as the air leaks back out through the pipe 1 through a vent orifice of the bleeder valve. Such a vent orifice is formed in the valve of the auxiliary air reservoir at $y$, Fig. 3, where it will be seen that the outer end of said valve stem is slightly smaller than its guide hole, just enough to prevent an air cushion from being imprisoned behind the supplementary piston after the brakes are released.

From the foregoing it will be seen that the objection to the old method of releasing the brakes, when the brakes are applied to full service application and the train pipe has leaks in it, is that the train pipe will leak— say 10 pounds—before the engineer applies his releasing pressure. The pump will then have, say, 11 pounds to gain, to more than compensate for the leakage, before the brakes can be released, and if a bleeder cock or two are opened from the auxiliary reservoir and 15 or 20 pounds are bled (it being impossible to tell how many pounds are out before the brakes are off) the pump has to make more than 11 pounds before release comes to the rest of triple valves on the train. Furthermore, this air that is bled out is wasted and a much longer time is required to let off the brakes.

With my invention I release the brakes promptly and economize air by taking air from the auxiliary reservoir to a differential cylinder which moves the differential piston and forces back the triple valve piston to release position, which instantly releases the brake and the air from the auxiliary reservoir equalizes in the train pipe by coming back through the triple valve by way of the feed groove $g$ through which it ordinarily goes to the auxiliary reservoir.

My invention is shown applied to the ordinary form of triple valve, but I would have it understood that it may equally as well be applied to the more modern K-triple valve, or any other triple valve in which a triple valve piston operates a port-adjusting valve. I would also have it understood that the auxiliary air reservoir need not be placed as shown, but may be placed in any desired position and be connected to the cylinder 2 by any sort of duct or passage way controlled by a valve.

I claim—

1. In an air brake system, the combination with the triple valve piston and its slide valve, of a supplementary cylinder and piston having an effective cross sectional area greater than that of the triple valve piston, a duct extending from the cylinder of the supplementary piston to the auxiliary air reservoir, a valve located in said duct to admit the air pressure of the said reservoir to the supplementary piston and a plunger between said supplementary piston and the triple valve piston, to apply the movement of the supplementary piston to the triple valve piston to quickly restore the latter to release position.

2. In an air brake system, the combination with the triple valve piston and its slide valve, of a supplementary cylinder and piston having an effective cross sectional area greater than that of the triple valve piston, a duct extending from the cylinder of the supplementary piston to the auxiliary air reservoir, a valve located in said duct to admit the air pressure of the said reservoir to the supplementary piston and a plunger between said supplementary piston and the triple valve piston, to apply the movement of the supplementary piston to the triple valve piston to quickly restore the latter to release position, said plunger consisting of a piston rod bearing a concentric and independently movable stem arranged to be projected against the triple valve piston.

3. In an air brake system, the combination with the triple valve piston and its slide valve, of a supplementary cylinder and piston having an effective cross sectional area greater than that of the triple valve piston, a duct extending from the cylinder of the supplementary piston to the auxiliary air reservoir, a valve located in said duct to admit the air pressure of the said reservoir to the supplementary piston and a plunger between said supplementary piston and the triple valve piston, to apply the movement of the supplementary piston to the triple valve piston to quickly restore the latter to release position, said plunger consisting of a piston rod bearing a concentric and independently movable stem arranged to be projected against the triple valve piston and said stem being spring seated.

4. In an air brake system, the combination with the triple valve piston and its slide valve, of a supplementary cylinder and piston having an effective cross sectional area greater than that of the triple valve piston, a duct extending from the cylinder of the supplementary piston to the auxiliary air reservoir, a valve located in said duct to admit the air pressure of the said reservoir to the supplementary piston and a plunger between said supplementary piston and the triple valve piston, to apply the movement of the supplementary piston to the triple valve piston to quickly restore the latter to release position, said plunger consisting of a piston rod bearing a concentric and independently movable stem arranged to be projected against the triple valve piston and said stem being spring seated and having around it a sliding washer and a spring bearing thereagainst and a stop shoulder on the stem bearing against the washer.

5. In an air brake system, the combination with the triple valve piston and its slide valve, of a supplementary cylinder and piston having an effective cross sectional area greater than that of the triple valve piston, a duct extending from the cylinder of the supplementary piston to the auxiliary air reservoir, a valve located in said duct to admit the air pressure of the said reservoir to the supplementary piston and a plunger between said supplementary piston and the triple valve piston, to apply the movement of the supplementary piston to the triple valve piston to quickly restore the latter to release position and a handle for manually operating the valve in said connecting duct.

6. In an air brake system, the combination with the triple valve piston and its slide valve, of a supplementary cylinder and piston having an effective cross sectional area greater than that of the triple valve piston, a duct extending from the cylinder of the supplementary piston to the auxiliary air reservoir, a valve located in said duct to admit the air pressure of the said reservoir to the supplementary piston and a plunger between said supplementary piston and the triple valve piston, to apply the movement of the supplementary piston to the triple valve piston to quickly restore the latter to release position, the valve in said duct being provided with a leakage vent for allowing the escape of air behind the supplementary piston when communication between the supplementary cylinder and auxiliary air reservoir is cut off.

7. In an air brake system, the combination with the triple valve piston and the auxiliary air reservoir, of a supplementary pneumatic plunger arranged to force back the triple valve to the brake-release position and a duct extending from said plunger to the auxiliary air reservoir and a controlling valve for the same.

In testimony whereof I affix my signature in presence of two witnesses.

WILLIAM S. DE CAMP.

Witnesses:
   Wm. D. Leissler, Jr.,
   F. A. Milligan.